(12) United States Patent
Ioku et al.

(10) Patent No.: US 12,502,955 B2
(45) Date of Patent: Dec. 23, 2025

(54) IRREGULAR GROUND TRAVELLING VEHICLE

(71) Applicant: KAWASAKI MOTORS, LTD., Hyogo (JP)

(72) Inventors: Yasuyuki Ioku, Akashi (JP); Kazuho Matsumoto, Akashi (JP); Yuji Hida, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 208 days.

(21) Appl. No.: 18/215,911

(22) Filed: Jun. 29, 2023

(65) Prior Publication Data
US 2025/0001856 A1    Jan. 2, 2025

(51) Int. Cl.
| | |
|---|---|
| B60K 17/16 | (2006.01) |
| B60K 17/356 | (2006.01) |
| F16H 57/04 | (2010.01) |
| B60K 23/08 | (2006.01) |

(52) U.S. Cl.
CPC ............ B60K 17/16 (2013.01); B60K 17/356 (2013.01); F16H 57/0409 (2013.01); F16H 57/0452 (2013.01); B60K 2023/0858 (2013.01); B60K 2702/02 (2013.01)

(58) Field of Classification Search
CPC .. F16H 3/006; F16H 57/0409; F16H 57/0452; B60K 17/16; B60K 17/356; B60K 2023/0858; B60K 2702/02
See application file for complete search history.

(56) References Cited

U.S. PATENT DOCUMENTS

| | | | |
|---|---|---|---|
| 7,946,953 B2 | 5/2011 | Koga et al. | |
| 10,400,834 B2* | 9/2019 | Sugiura | F16H 57/0484 |
| 2003/0042104 A1* | 3/2003 | Matsufuji | F16D 25/12 |
| | | | 192/48.611 |
| 2009/0045026 A1* | 2/2009 | Ishii | F16H 3/006 |
| | | | 192/85.42 |
| 2009/0120710 A1* | 5/2009 | Hasegawa | F16H 61/688 |
| | | | 180/365 |

* cited by examiner

Primary Examiner — William C Joyce
(74) Attorney, Agent, or Firm — Wenderoth, Lind & Ponack, L.L.P.

(57) ABSTRACT

An irregular ground travelling vehicle includes a drive source and a transmission. The transmission includes: a drive shaft; a multiple disc clutch configured to connect or disconnect power from the drive source to the drive shaft; a driven shaft; gear-position gear trains between the drive shaft and the driven shaft; engaging clutches configured to enable power transmission of each of the gear-position gear trains; a transmission case that accommodates the drive shaft, the driven shaft, the gear-position gear trains, and the engaging clutches; an oil storage portion configured to store oil for hydraulic control of the multiple disc clutch and the engaging clutches at a bottom portion of the transmission case, the oil storage portion having a deepest portion at a center in a vehicle left-right direction of the oil storage portion in a vehicle mounted state; and an oil strainer having a suction port in the oil storage portion.

17 Claims, 7 Drawing Sheets

ENLARGED VIEW OF CLUTCH

IRREGULAR GROUND TRAVELLING VEHICLE

BACKGROUND OF THE INVENTION

Technical Field

The present disclosure relates to an irregular ground travelling vehicle.

Related Art

U.S. Pat. No. 7,946,953 discloses a utility vehicle including a clutch that hydraulically controls power input from a drive source. The hydraulic oil used for this hydraulic control is sucked up by an oil pump via a strainer and supplied to the clutch.

SUMMARY

In an irregular ground travelling vehicle traveling on an irregular ground, hydraulic oil in a transmission may be located to be biased to one side in a vehicle front-rear direction or one side in a vehicle left-right direction because the vehicle is greatly inclined in the vehicle front-rear direction and the vehicle left-right direction according to a situation of a road surface. In this case, when sufficient oil cannot be sucked up from an oil strainer, the supply amount and/or the hydraulic pressure of the hydraulic oil from an oil pump to a clutch may be insufficient, and the shift operation may not be performed quickly.

An object of the present disclosure is to reduce an influence due to a road surface condition to stably perform a shift operation in an irregular ground travelling vehicle including a transmission of a constantly-meshing type in which a shift operation is automatically performed by hydraulic control.

One aspect of the present disclosure provides an irregular ground travelling vehicle including: a drive source; and a transmission, the transmission including: a drive shaft to which power is input from the drive source; a multiple disc clutch that connects/disconnects power from the drive source to the drive shaft; a driven shaft; a plurality of gear-position gear trains provided between the drive shaft and the driven shaft, each of the plurality of gear-position gear trains being configured such that a gear that is relatively non-rotatable with respect to one of the drive shaft and the driven shaft and a gear that is relatively rotatable with respect to the other of the drive shaft and the driven shaft are constantly meshed with each other; a plurality of engaging clutches that enable power transmission of each of the plurality of gear-position gear trains; a transmission case that accommodates the drive shaft, the driven shaft, the plurality of gear-position gear trains, and the plurality of engaging clutches; an oil storage portion in which oil used for hydraulic control of the multiple disc clutch and the engaging clutch is stored at a bottom portion of the transmission case, the oil storage portion having a deepest portion located at a center of the oil storage portion in a vehicle left-right direction in a vehicle mounted state; and an oil strainer having a suction port located in the oil storage portion.

According to the irregular ground travelling vehicle of the present disclosure, in the constantly-meshing transmission including the multiple disc clutch and the engaging clutch that are hydraulically controlled, the deepest portion of the oil storage portion is provided at the center in the vehicle left-right direction. As a result, the oil is easily held in the oil storage portion even when the transmission is greatly inclined in the vehicle left-right direction according to the inclination situation of the road surface on which the irregular ground travelling vehicle travels. Therefore, since the oil suction performance by the oil strainer is easily maintained, it is easy to stably control the hydraulic pressure of the multiple disc clutch and the engaging clutch. Therefore, it is easy to stably operate the constantly-meshing transmission that is hydraulically controlled regardless of the inclination situation of the road surface.

BRIEF DESCRIPTION OF THE DRAWINGS

The foregoing and the other features of the present disclosure will become apparent from the following description and drawings of an illustrative embodiment of the disclosure in which.

DETAILED DESCRIPTION OF EMBODIMENTS

Hereinafter, an irregular ground travelling vehicle 1 according to an embodiment of the present disclosure will be described with reference to the accompanying drawings. Note that the following description is merely exemplary in nature and is not intended to limit the present disclosure, an object for application, or a usage. The irregular ground travelling vehicle 1 is mainly a vehicle for traveling not only on grasslands, gravel, and sand but also on an off road such as unpaved mountain roads, forest roads, muddy areas, and rocky areas, and the vehicle body may be greatly inclined in the vehicle front-rear direction and/or the vehicle left-right direction depending on a road surface condition.

In the following description, the front-rear direction, the left-right direction, and the up-down direction as viewed from the driver are referred to as the front-rear direction, the left-right direction, and the up-down direction of the irregular ground travelling vehicle and each component.

Figure 1:
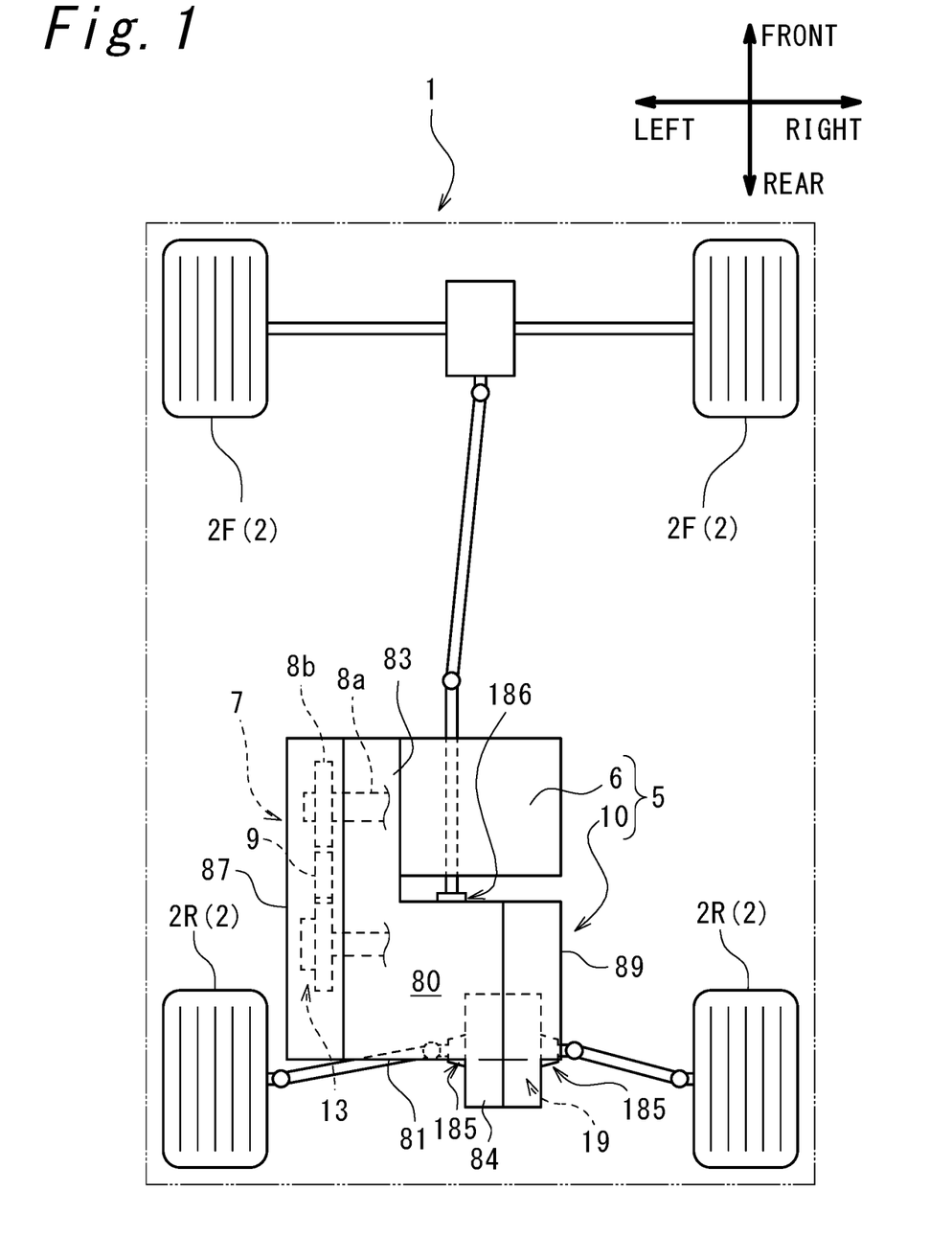
FIG. 1 is a schematic plan view of an irregular ground travelling vehicle according to an embodiment of the present disclosure.

FIG. 1 is a schematic plan view of the irregular ground travelling vehicle 1. As illustrated in FIG. 1, the irregular ground travelling vehicle 1 has wheels 2 including left and right front wheels 2F and left and right rear wheels 2R, and a power unit 5 for rotationally driving the wheels 2.

The power unit 5 has a drive source 6 and a transmission 10. The drive source 6 generates power for rotationally driving the wheel 2. The power from the drive source 6 is transmitted to the wheels 2 via the transmission 10. In the present embodiment, the drive source 6 is an engine disposed such that a crank shaft 8a as an output shaft points toward the vehicle width direction. The drive source 6 may include an electric motor instead of or in addition to the engine.

Figure 2:
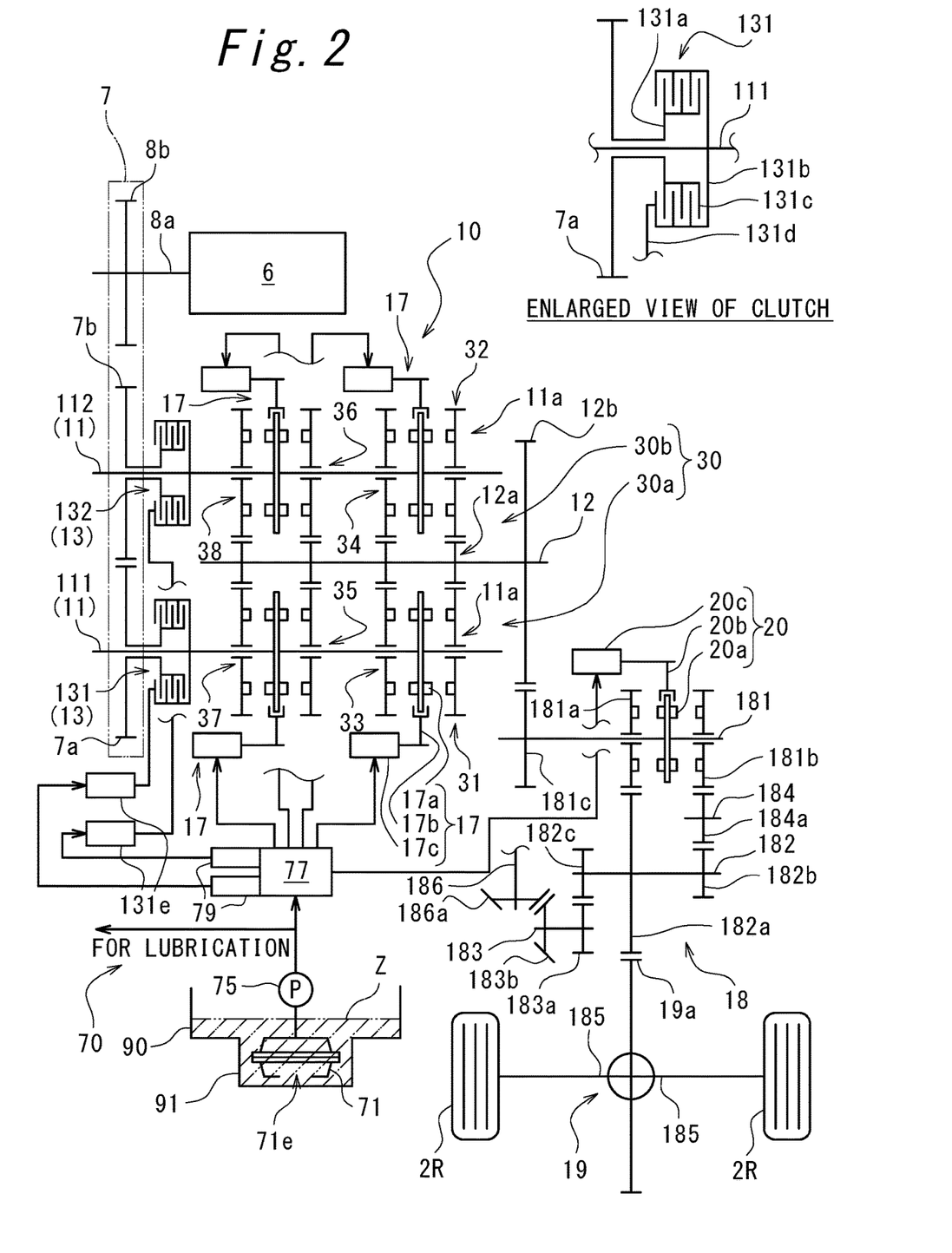
FIG. 2 is a schematic configuration diagram of a transmission mechanism.

FIG. 2 is a schematic configuration diagram of the transmission 10. The transmission 10 is disposed on a power transmission path from the drive source 6 to the wheels 2, and is configured to shift and output power generated by the drive source 6. As illustrated in FIG. 2, the transmission 10 includes a drive shaft 11 to which power from the drive source 6 is input, a driven shaft 12 that is disposed in parallel with the drive shaft 11 and outputs the power from the drive source 6 input to the drive shaft 11, a multiple disc clutch 13 that connects/disconnects the power from the drive source 6 input to the drive shaft 11, and a plurality of gear-position gear trains 30 that are provided between the drive shaft 11 and the driven shaft 12 and constitute each gear position.

Connection/disconnection of the multiple disc in clutch 13 is controlled by hydraulic control. Each of the plurality of gear-position gear trains 30 can transmit power by hydraulic control, and constitutes a gear position corresponding to the gear train capable of transmitting power. The transmission 10 further includes a hydraulic control device 70 for hydraulically controlling the multiple disc clutch 13 and the plurality of gear-position gear trains 30.

The transmission 10 is a dual clutch transmission (DCT). The drive shaft 11 includes a first drive shaft 111 and a second drive shaft 112. The driven shaft 12 is disposed parallel to the first drive shaft 111 and the second drive shaft 112. The multiple disc clutch 13 includes a first clutch 131 and a second clutch 132 that connect/disconnect power from the drive source 6 input to the first drive shaft 111 and the second drive shaft 112, respectively. The plurality of gear-position gear trains 30 includes a plurality of first gear trains 30a and a plurality of second gear trains 30b provided between the first drive shaft 111 and the driven shaft 12 and between the second drive shaft 112 and the driven shaft 12, respectively.

Figure 3:
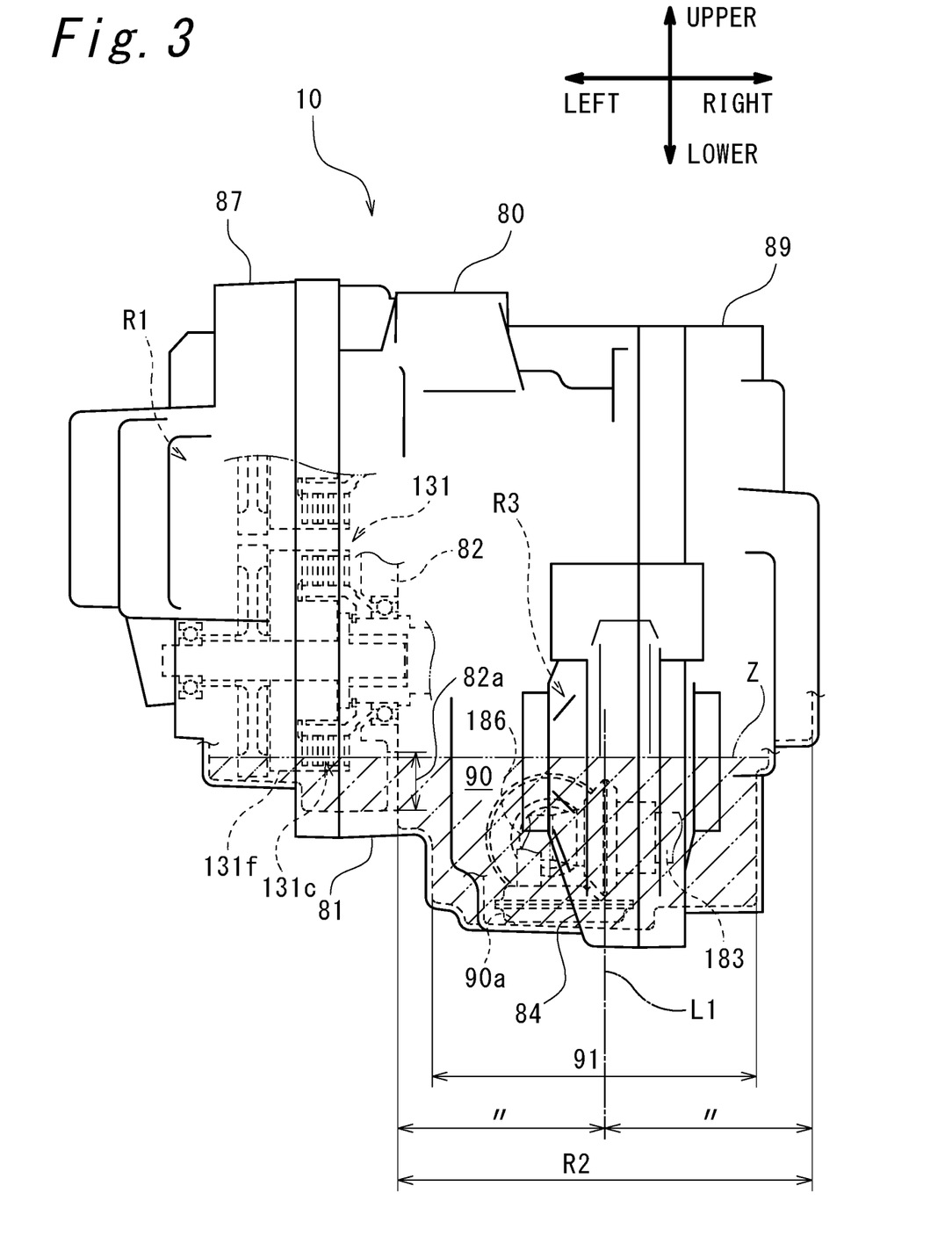
FIG. 3 is a rear view of the transmission.

FIG. 3 is a rear view of the transmission 10. As illustrated in FIG. 3, the transmission 10 includes a transmission case 80, a clutch cover 87 attached to the left side of the transmission case 80, and a transmission gear cover 89 attached to the right side of the transmission case 80, which constitute an outer shell.

The transmission case 80 includes a cylindrical case body 81 extending in the vehicle left-right direction on the rear side of the drive source 6 (see FIG. 1) and a partition wall 82 separating the inside of the case body 81 in the vehicle left-right direction. The partition wall 82 is located on the left side of the case body 81 in the vehicle left-right direction.

Referring also to FIG. 1, the transmission case 80 further includes a first extension portion 83 extending forward from a left end of the case body 81 and a second extension portion 84 extending rearward from a right end of the case body 81. The first extension portion 83 extends the left end opening of the case body 81 forward. A left end surface of the drive source 6 is connected to a right end surface of the first extension portion 83. The second extension portion 84 extends the right end opening of the case body 81 rearward.

Figure 4:
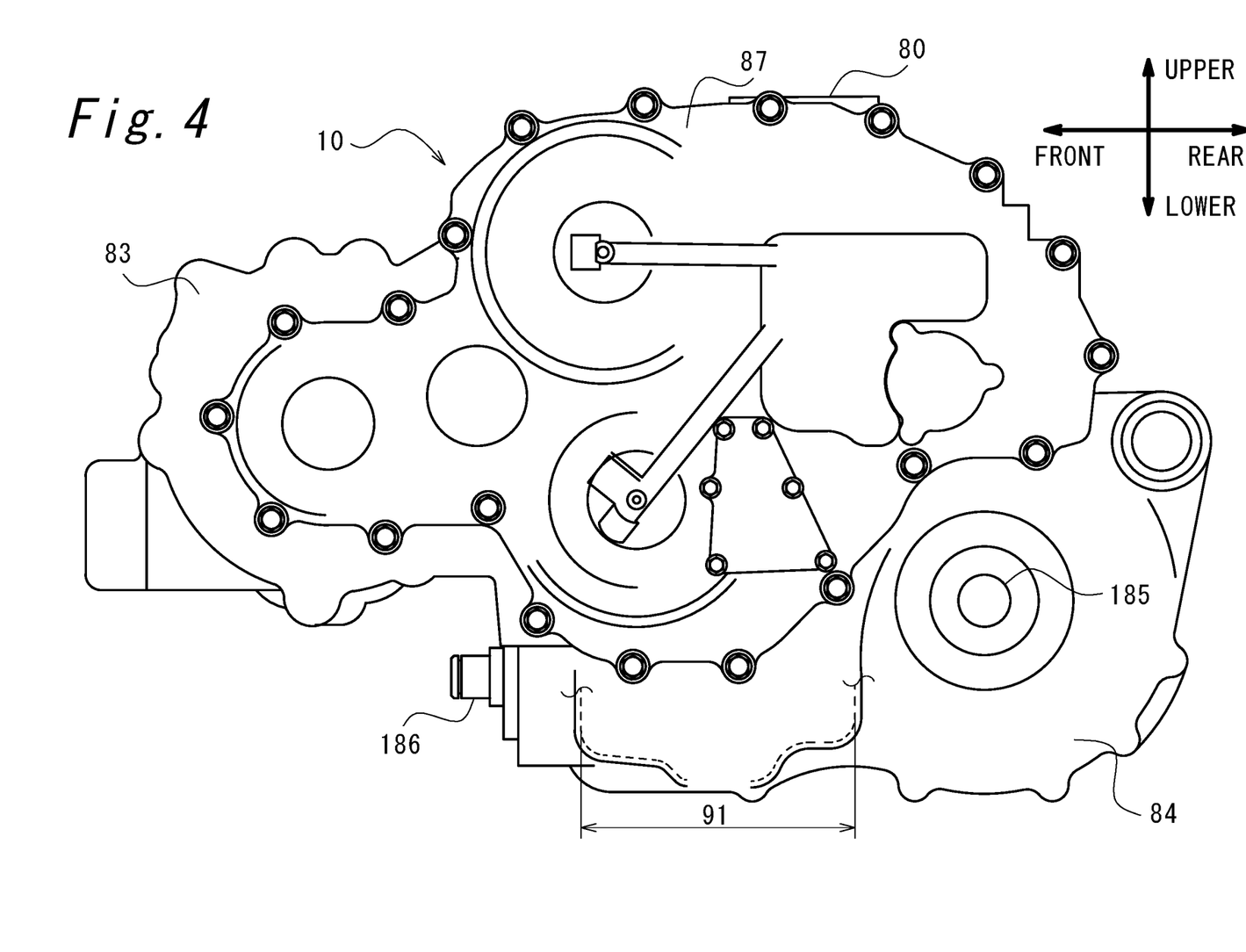
FIG. 4 is a left side view of the transmission.

FIG. 4 is a left side view of the transmission 10. As illustrated in FIG. 4, the clutch cover 87 closes the left opening of the transmission case 80 defined by the case body 81 and the first extension portion 83 from the left side. As illustrated in FIG. 3, a clutch chamber R1 in which the multiple disc clutch 13 is accommodated is defined on the left side of the partition wall 82 in a region surrounded by the case body 81, the first extension portion 83, and the clutch cover 87.

Figure 5:
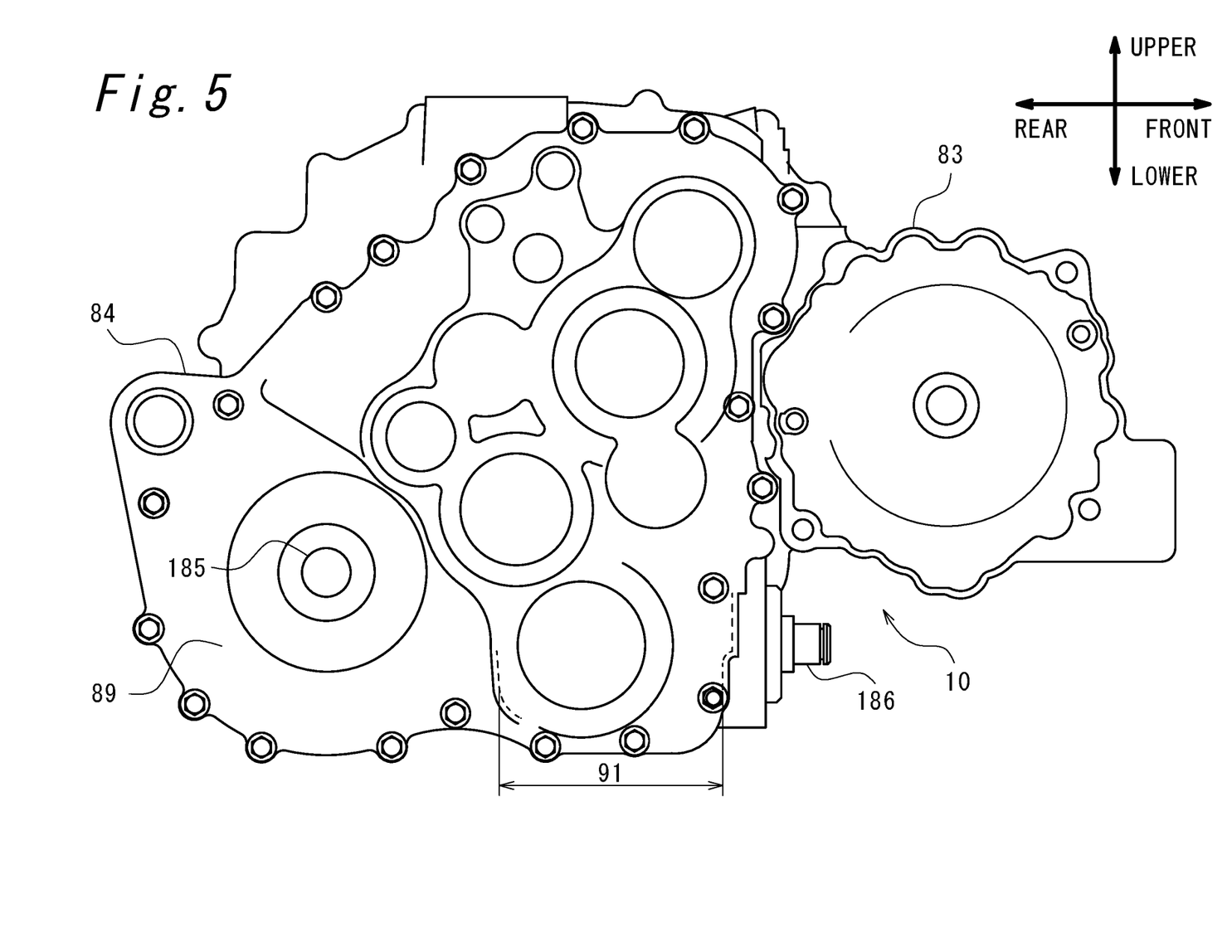
FIG. 5 is a right side view of the transmission.

FIG. 5 is a right side view of the transmission 10. As illustrated in FIG. 5, the transmission gear cover 89 closes the right opening of the transmission case 80 defined by the case body 81 and the second extension portion 84 from the right side. As illustrated in FIG. 3, a transmission gear chamber R2 in which the drive shaft 11, the driven shaft 12, and the gear-position gear train 30 are accommodated is defined on the right side of the partition wall 82 in a region surrounded by the case body 81 and the transmission gear cover 89.

A differential gear chamber R3 in which a differential device 19 for the rear wheel 2R is accommodated is formed in a region surrounded by the second extension portion 84 and the transmission gear cover 89. A front end of the differential gear chamber R3 communicates with a rear end of the transmission gear chamber R2.

Figure 6:
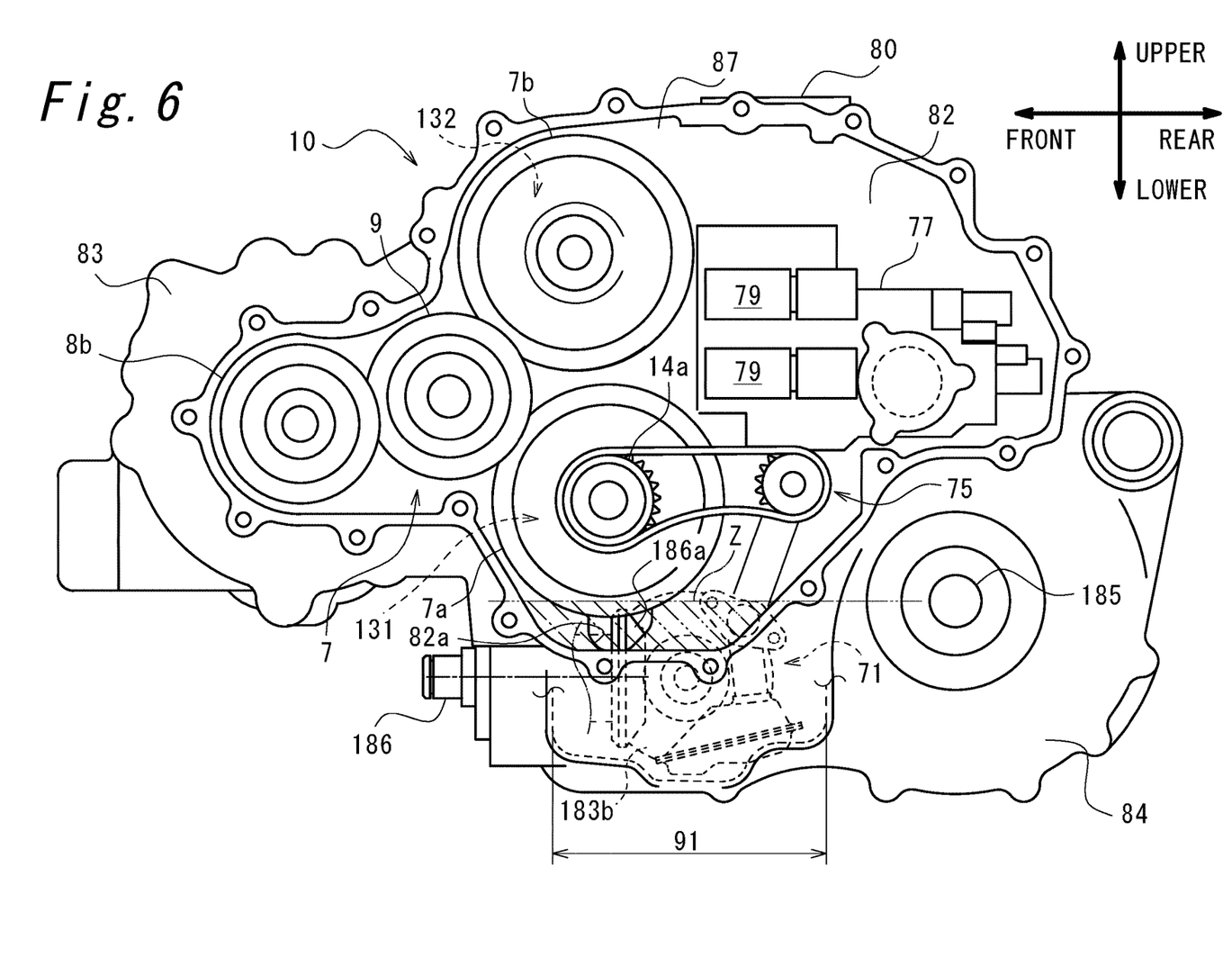
FIG. 6 is a left side view of the transmission illustrating a state in which a clutch cover is removed.

Referring also to FIG. 6, a through hole 82a penetrating in the left-right direction is formed at the lower end of the partition wall 82. The clutch chamber R1 and the transmission gear chamber R2 communicate with each other through the through hole 82a.

The bottom portion of the transmission gear chamber R2 is provided with an oil storage portion 90 that stores oil used for hydraulic control of the multiple disc clutch 13 and the plurality of gear-position gear trains 30. The oil storage portion 90 also extends to the clutch chamber R1 on the left side of the partition wall 82 through the through hole 82a. In other words, the oil storage portion 90 is formed across the transmission gear chamber R2 and the clutch chamber R1. Therefore, the lower end of the through hole 82a is set to be lower than an oil level Z of the oil stored in the oil storage portion 90 during the operation of the transmission 10, and the upper end of the through hole 82a is set to be equal to or slightly higher than the oil level Z of the oil.

Referring also to FIGS. 4 and 5, the oil storage portion 90 has, on the bottom side, a bottom-side oil storage portion 91 whose width dimension in the vehicle front-rear direction and width dimension in the vehicle left-right direction are smaller than those on the upper side. The bottom-side oil storage portion 91 is located substantially at the center of the transmission gear chamber R2 in the vehicle left-right direction and the vehicle front-rear direction. Specifically, a center line L1 (see FIG. 3) of the transmission gear chamber R2 in the vehicle left-right direction and a center line L2 (see FIG. 7) of the transmission gear chamber R2 in the vehicle front-rear direction pass through the bottom-side oil storage portion 91.

FIG. 6 is a left side view of the transmission 10 from which the clutch cover 87 has been removed. As illustrated in FIG. 6, the clutch chamber R1 is provided with a primary reduction mechanism 7 that transmits power from the drive source 6 (see FIG. 1) to the multiple disc clutch 13 (see FIG. 3).

The primary reduction mechanism 7 includes an output drive gear 8b fixed to the crank shaft 8a of the drive source 6, and a first input gear 7a and a second input gear 7b that are respectively arranged on the axes of the first drive shaft 111 and the second drive shaft 112 and mesh with the output drive gear 8b. The primary reduction mechanism 7 reduces and transmits the rotation of the crank shaft 8a to the first input gear 7a and the second input gear 7b. In the present embodiment, the output drive gear 8b engages with the first input gear 7a and the second input gear 7b via the intermediate gear 9.

The first clutch 131 is located below the second clutch 132. Therefore, the first clutch 131 is a lower clutch according to the present disclosure, and the second clutch 132 is an upper clutch according to the present disclosure.

As illustrated in FIG. 2, the first clutch 131 includes an input rotary member 131a, an output rotary member 131b, a plurality of friction plates 131c disposed between the input rotary member 131a and the output rotary member 131b, a piston 131*d* that fastens the plurality of friction plates 131*c*, and a hydraulic actuator 131*e* that biases the piston 131*d* in the fastening direction of the friction plates 131*c*. Hydraulic pressure is supplied from the hydraulic control device 70 to the hydraulic actuator 131*e*.

In the present embodiment, the input rotary member 131*a* of the first clutch 131 is fixed to the first input gear 7*a* and is rotated together with the first input gear 7*a*. The output rotary member 131*b* of the first clutch 131 is fixed to the first drive shaft 111 and rotated together with the first drive shaft 111. The hydraulic actuator 131*e* automatically performs connection/disconnection of the first clutch 131. Note that the rotary member 131*b* of the first clutch 131 may be configured to rotate together with the first input gear 7*a* as an input member, and the rotary member 131*a* of the first clutch 131 may be configured to rotate together with the first drive shaft 111 by being fixed to the first drive shaft 111 as an output member. Since the second clutch 132 is configured similarly to the first clutch 131, the description thereof will be omitted.

As illustrated in FIG. 3, the lower end of the first clutch 131 is located above a deepest portion 90*a* of the oil storage portion 90 and below the oil level Z of the oil. That is, the first clutch 131 has a clutch first portion 131*f* located in the oil storage portion 90 at the lower end. More specifically, the oil level Z of the oil storage portion 90 is located above the lower ends of the plurality of friction plates 131*c*.

As illustrated in FIG. 2, a transmission mechanism 17 that shifts power from the drive source 6 input to each of the first drive shaft 111 and the second drive shaft 112 and outputs the power to the driven shaft 12 is provided. The rotation of the output gear 12*b* fixed to the driven shaft 12 is transmitted to the input gear 19*a* of the differential device 19 via the final reduction mechanism 18, and finally transmitted from a first output unit 185 to the left and right rear wheels 2R. The clutch first portion 131*f* is located below the center position of the first output unit 185.

In the present embodiment, the transmission 10 is configured to be capable of shifting to a forward eighth gear position and a reverse gear position. Eight gear-position gear trains 31 to 38 of a constantly-meshing type are provided between the first drive shaft 111 and the second drive shaft 112 and the driven shaft 12. Between the first drive shaft 111 and the driven shaft 12, there are provided the gear-position first gear trains 30*a* that are odd gear-position gear trains including a first gear-position gear train 31, a third gear-position gear train 33, a fifth gear-position gear train 35, and a seventh gear-position gear train 37. Between the second drive shaft 112 and the driven shaft 12, there are provided the gear-position second gear trains 30*b* that are even gear-position gear trains including a second gear-position gear train 32, a fourth gear-position gear train 34, a sixth gear-position gear train 36, and an eighth gear-position gear train 38.

In the present embodiment, the first gear position is configured as a starting gear position. That is, in the starting gear position, the first drive shaft 111 and the first clutch 131 located on the lower side are used. As a result, for example, the first clutch 131 is used in the starting gear position in which the amount of heat generated in the multiple disc clutch 13 tends to be larger than that in other gear positions for half-clutch control at the time of starting or the like, but since the lower end of the first clutch 131 is located in the oil storage portion 90, the first clutch 131 is effectively cooled by the oil, and seizure of the clutch is suppressed.

Each of the plurality of gear-position gear trains 30 includes a drive gear 11*a* on the drive shaft 11 and a driven gear 12*a* on the driven shaft 12. In each of the plurality of gear-position gear trains 30, one of the drive gear 11*a* and the driven gear 12*a* is relatively rotatable and axially relatively non-movable with respect to the drive shaft 11 or the driven shaft 12, and the other is relatively non-rotatable and axially relatively non-movable with respect to the drive shaft 11 or the driven shaft 12.

In the present embodiment, in each of the plurality of gear-position gear trains 30, the drive gear 11*a* is relatively rotatable and axially relatively non-movable with respect to the drive shaft 11, and the driven gear 12*a* is relatively non-rotatable and axially relatively non-movable with respect to the driven shaft 12. In the present embodiment, each driven gear 12*a* is used in common on the first gear train 30*a* and the second gear train 30*b*.

The transmission mechanism 17 includes an engaging clutch (dog clutch) 17*a* that switches the gear-position gear train 30 to a power transmittable state, a transmission shifter 17*b* that moves each engaging clutch 17*a* in the axial direction, and a hydraulic actuator 17*c* that moves the transmission shifter 17*b*. A plurality of engaging clutches 17*a*, a plurality of transmission shifters 17*b*, and a plurality of hydraulic actuators 17*c* are provided corresponding to the plurality of gear-position gear trains 30.

The engaging clutch 17*a* moves in the axial direction and engages with the drive gear 11*a* or the driven gear 12*a* that is relatively rotatable with respect to the drive shaft 11 or the driven shaft 12, thereby bringing the gear into a power transmittable state. In the present embodiment, the transmission mechanism 17 is engaged with one of the drive gears 11*a*, and enables power transmission through a gear-position gear train including the one drive gear 11*a*. That is, the rotation transmitted to the first drive shaft 111 or the second drive shaft 112 is transmitted to the driven shaft 12 via the gear-position gear train in which power can be transmitted by the transmission mechanism 17, and is output from the output gear 12*b* of the driven shaft 12.

The final reduction mechanism 18 includes a counter shaft 181 rotationally driven by the driven shaft 12, a first output shaft 182 rotationally driven by the forward gear 181*a* of the counter shaft 181, and a second output shaft 183 rotationally driven by the first output shaft 182. The final reduction mechanism 18 further includes an idler shaft 184 rotationally driven by a reverse gear 181*b* of the counter shaft 181. The first output shaft 182 is also rotationally driven by the idler shaft 184.

The counter shaft 181 is provided with an input gear 181*c* that is relatively non-rotatable and axially relatively non-movable with respect to the counter shaft 181, the forward gear 181*a* and the reverse gear 181*b* that are relatively rotatable and axially relatively non-movable with respect to the counter shaft 181, and a forward/reverse switching mechanism 20 provided between the forward gear 181*a* and the reverse gear 181*b*. The input gear 181*c* meshes with the output gear 12*b* of the driven shaft 12.

The forward/reverse switching mechanism 20 includes an engaging clutch (dog clutch) 20*a* that switches the forward gear 181*a* or the reverse gear 181*b* so as to enable power transmission, a transmission shifter 20*b* that moves the engaging clutch 20*a* in the axial direction, and a hydraulic actuator 20*c* that moves the transmission shifter 20*b*. The engaging clutch 20*a* is relatively non-rotatable and axially relatively movable with respect to the counter shaft 181. The engaging clutch 20*a* moves in the axial direction and engages with the forward gear 181*a* or the reverse gear 181*b*, thereby bringing the engaged gear into a power transmittable state.

The first output shaft 182 is provided with a forward input gear 182*a*, a reverse input gear 182*b*, and an output gear 182*c* which are relatively non-rotatable and axially relatively non-movable with respect to the first output shaft 182. The forward input gear 182*a* meshes with the forward gear 181*a* of the counter shaft 181. The reverse input gear 182*b* meshes with an idler gear 184*a* of the idler shaft 184. The output gear 182*c* rotationally drives the second output shaft 183. In the present embodiment, the forward input gear 182*a* also meshes with the input gear 19*a* of the differential device 19 to rotationally drive the differential device 19.

The differential device 19 distributes the driving force to the left and right and outputs the driving force from the first output unit 185 toward the rear wheel 2R which is a first drive wheel. A drive shaft for driving the rear wheels is inserted into the first output unit 185.

The second output shaft 183 is provided with an input gear 183*a* and an output gear 183*b* that are relatively non-rotatable and axially relatively non-movable with respect to the second output shaft 183. The input gear 183*a* meshes with the output gear 182*c* of the first output shaft 182. The output gear 183*b* meshes with an input gear 186*a* of the second output unit 186 that rotationally drives the front wheel 2F.

The output gear 183*b* and the input gear 186*a* are bevel gears, and the rotation of the second output shaft 183 about the axis along the left-right direction is converted into the rotation of the second output unit 186 about the axis along the front-rear direction. The second output unit 186 may be provided with a two-wheel drive/four-wheel drive switching mechanism that switches between a two-wheel drive state in which only the rear wheels 2R are driven and a four-wheel drive state in which the rear wheels 2R and the front wheels 2F are driven.

Figure 7:
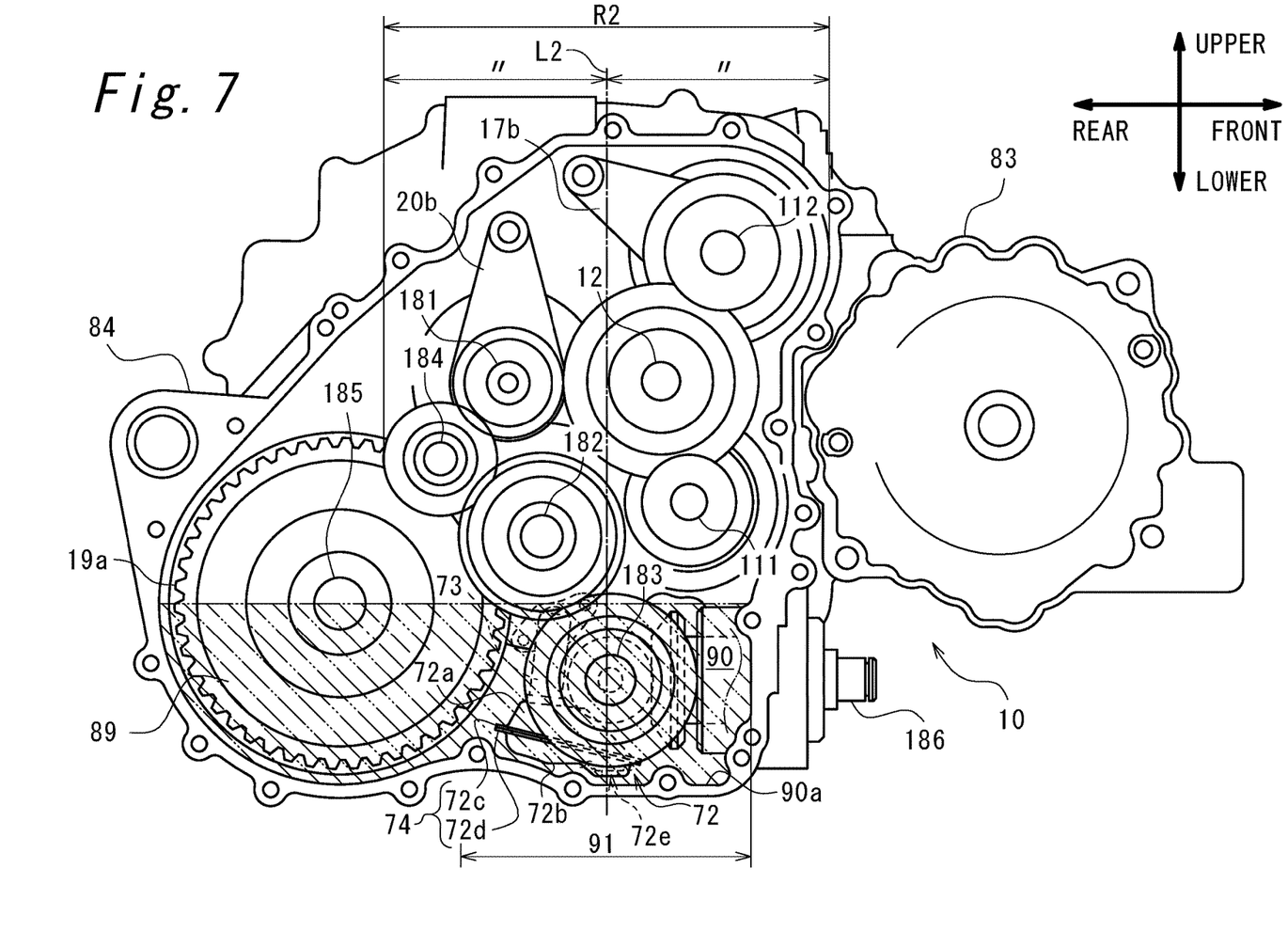
FIG. 7 is a right side view of the transmission illustrating a state in which a transmission gear cover is removed.

FIG. 7 is a right side view of the transmission 10 in a state where the transmission gear cover 89 is removed. As illustrated in FIG. 7, the oil level Z of the oil storage portion 90 is substantially located at the center position of the first output unit 185, and is substantially located above the second output shaft 183 and the second output unit 186. The first output unit 185 and the second output unit 186 are located above the deepest portion 90*a* of the oil storage portion 90. As illustrated in FIG. 3, the upper end of the bottom-side oil storage portion 91 is substantially located at the axial center positions of the second output shaft 183 and the second output unit 186.

The hydraulic control device 70 will be described with reference to FIG. 2. The hydraulic control device 70 includes an oil pump 75 that sucks up oil from the oil storage portion 90 defined in an inner bottom portion of the transmission 10 via an oil strainer 71, an oil control valve 79 that controls hydraulic pressure supply to the multiple disc clutch 13, and a hydraulic control circuit 77 that controls hydraulic pressure supply to the hydraulic actuators 17*c* and 20*c* and the oil control valve 79.

Referring also to FIG. 7, the oil strainer 71 includes a strainer body 72 located in the bottom-side oil storage portion 91, and a pipe portion 73 extending from the strainer body 72 toward the oil pump 75.

The strainer body 72 is vertically divided into two parts of an upper strainer body 72*a* located on the upper side and a lower strainer body 72*b* located on the lower side. The upper strainer body 72*a* has an upper flange 72*c* extending outward from the entire circumference of the lower edge. The lower strainer body 72*b* has a lower flange 72*d* extending outward from the entire circumference of the upper edge, and a suction port 72*e* opened vertically at the lower end. The suction port 72*e* is open at the deepest portion of the bottom-side oil storage portion 91.

The upper strainer body 72*a* and the lower strainer body 72*b* are joined at the upper flange 72*c* and the lower flange 72*d* by using appropriate joining means such as brazing and welding. A portion where the upper flange 72*c* and the lower flange 72*d* are joined together constitutes a partition wall portion 74 of the oil strainer 71 according to the present disclosure. The partition wall portion 74 is located below the second output shaft 183 and the second output unit 186 and above the suction port 72*e* of the oil strainer 71.

Therefore, the partition wall portion 74 reduces the influence of the oil scraped in the oil storage portion 90 due to the rotation of the input gear 183*a* and the output gear 183*b* of the second output shaft 183 and the input gear 186*a* of the second output unit 186 to the suction port 72*e* of the oil strainer 71.

As illustrated in FIG. 6, the oil pump 75 is rotationally driven by the input rotary member 14*a* fixed coaxially to the first input gear 7*a*, increases the pressure of the oil sucked up through the oil strainer 71, and supplies the oil to the hydraulic control circuit 77. An oil filter may be interposed in the middle of a hydraulic path from the oil pump 75 to the hydraulic control circuit 77. In the oil pump 75, a pump chamber is formed in the partition wall 82 of the transmission case 80.

The oil discharged from the oil pump 75 is also used for lubrication of one or more components selected from the group including the multiple disc clutch 13, the drive shaft 11, the driven shaft 12, the plurality of gear-position gear trains 30, and the engaging clutch 17*a*.

The hydraulic control circuit 77 supplies hydraulic pressure to one of the plurality of hydraulic actuators 17*c* and 20*c* to move the transmission shifters 17*b* and 20*b* corresponding to the hydraulic actuators 17*c* and 20*c* in the axial direction. As a result, the corresponding gear-position gear train 30 can transmit power via the engaging clutches 17*a* and 20*a* operated by the transmission shifters 17*b* and 20*b*. As a result, in the transmission 10, a desired gear position corresponding to the gear-position gear train 30 capable of transmitting power is realized. In the present embodiment, the hydraulic control circuit 77 includes a plurality of solenoid valves for switching the oil passage.

The oil control valve 79 controls the magnitude of the hydraulic pressure supplied to the hydraulic actuator 131*e* of the multiple disc clutch 13 to control the fastening strength of the multiple disc clutch 13. In the present embodiment, the oil control valve 79 is a linear control valve that is electrically controlled to operate by a controller and continuously changes the hydraulic pressure of the supplied oil.

As illustrated in FIG. 6, the oil pump 75, the hydraulic control circuit 77, and the oil control valve 79 are attached to the left side surface of the partition wall 82 of the transmission case 80 and are located in the clutch chamber R1. The oil strainer 71 is attached to the right side of the partition wall 82. That is, hydraulic control devices are integrated on both left and right sides of the partition wall 82. In particular, the oil pump 75, the hydraulic control circuit 77, and the oil control valve 79 are provided on the left side of the partition wall 82, and easy access can be made by removing the clutch cover 87, so that maintainability is good.

The irregular ground travelling vehicle 1 according to the above embodiment provides the following aspects.

(1) An irregular ground travelling vehicle 1 includes a drive source 6 and a transmission 10, the transmission 10 including:

a drive shaft 11 to which power is input from the drive source 6;

a multiple disc clutch 13 that connects/disconnects power transmission from the drive source 6 to the drive shaft 11;

a driven shaft 12;

a plurality of gear-position gear trains 30 provided between the drive shaft 11 and the driven shaft 12, each of the plurality of gear-position gear trains 30 being configured such that a gear that is relatively non-rotatable with respect to one of the drive shaft 11 and the driven shaft 12 and a gear that is relatively rotatable with respect to the other of the drive shaft 11 and the driven shaft 12 are constantly meshed with each other;

a plurality of engaging clutches 17a that enable power transmission of each of the plurality of gear-position gear trains 30;

a transmission case 80 that accommodates the drive shaft 11, the driven shaft 12, the plurality of gear-position gear trains 30, and the plurality of engaging clutches 17a;

an oil storage portion 90 in which oil used for hydraulic control of the multiple disc clutch 13 and the engaging clutch 17a is stored at a bottom portion of the transmission case 80, the oil storage portion 90 having a deepest portion 90a located at a center of the oil storage portion 90 in a vehicle left-right direction in a vehicle mounted state; and an oil strainer 71 having a suction port 72e located in the oil storage portion 90.

As a result, in the constantly-meshing transmission 10 including the multiple disc clutch 13 and the engaging clutch 17a that are hydraulically controlled, the deepest portion 90a of the oil storage portion 90 is provided at the center in the vehicle left-right direction. As a result, the oil is easily held in the oil storage portion 90 even when the transmission 10 is greatly inclined in the vehicle left-right direction according to the inclination situation of the road surface on which the irregular ground travelling vehicle 1 travels. Therefore, since the oil suction performance by the oil strainer 71 is easily maintained, it is easy to stably control the multiple disc clutch 13 and the engaging clutch 17a by the hydraulic pressure. Therefore, it is easy to stably operate the constantly-meshing transmission 10 that is hydraulically controlled regardless of the inclination situation of the road surface.

(2) The deepest portion 90a of the oil storage portion 90 is located below a lower end of the multiple disc clutch 13.

(3) The irregular ground travelling vehicle 1 further includes a first output unit 185 that outputs a driving force shifted by the transmission 10 toward a rear wheel 2R which is a first drive wheel, and the deepest portion 90a of the oil storage portion 90 is located below the first output unit 185.

(4) The irregular ground travelling vehicle 1 further includes a second output unit 186 that outputs a driving force shifted by the transmission 10 toward a front wheel 2F which is a second drive wheel, and the deepest portion 90a of the oil storage portion 90 is located below the second output unit 186.

(5) A first clutch 131 includes a clutch first portion 131f located in the oil storage portion 90.

As a result, since the clutch first portion 131f is directly oil-cooled in the oil storage portion 90, the cooling performance of the first clutch 131 is improved. Accordingly, seizure of the first clutch 131 is suppressed.

(6) The transmission 10 is a dual clutch transmission including, as the multiple disc clutch 13, a second clutch 132 which is an upper clutch and a first clutch 131 which is a lower clutch located below the second clutch 132, and the first clutch 131 includes a clutch first portion 131f.

As a result, when the transmission 10 is a dual clutch having a pair of upper and lower clutches 131 and 132, the above-described operation effect is suitably exhibited in the first clutch 131 which is a lower clutch.

(7) The drive shaft 11 includes a first drive shaft 111 which is a lower drive shaft to which power is transmitted from the drive source 6 via the first clutch 131 and a second drive shaft 112 which is an upper drive shaft to which power is transmitted from the drive source 6 via the second clutch 132, and the gear-position gear train 30 constituting a starting gear position includes a drive gear 11a provided on the first drive shaft 111.

As a result, in the starting gear position in which the amount of heat generated in the multiple disc clutch 13 tends to be larger than that in other gear positions, the first clutch 131 including the clutch first portion 131f located on the lower side and located in the oil storage portion 90 is used. Therefore, it is easy to effectively cool the first clutch 131 which is likely to generate a large amount of heat.

(8) The multiple disc clutch 13 includes a plurality of friction plates 131c that is responsible for connection/disconnection of power transmission from the drive source 6 to the drive shaft 11, and the oil storage portion 90 is managed such that an oil level Z during operation of the transmission 10 is located above lower ends of the plurality of friction plates 131c.

As a result, since the plurality of friction plates 131c are directly oil-cooled in the oil storage portion 90, the cooling performance of the multiple disc clutch 13 is improved. Accordingly, seizure of the multiple disc clutch 13 is suppressed.

(9) The irregular ground travelling vehicle 1 further includes:

a first output unit 185 that outputs a driving force toward the rear wheels 2R which are the first drive wheels; and a second output unit 186 that outputs a driving force toward the front wheels 2F which are the second drive wheels, and an output gear 183b that transmits the driving force transmitted to the first output unit 185 to the second output unit 186 is disposed in the oil storage portion 90.

As a result, since the output gear 183b can be disposed using the space of the oil storage portion 90, the transmission 10 can be easily made compact.

(10) The irregular ground travelling vehicle 1 further includes a partition wall portion 74 located between the suction port 72e of the oil strainer 71 and the output gear 183b in the oil storage portion 90.

As a result, while the suction port 72e of the oil strainer 71 and the output gear 183b are disposed in the oil storage portion 90, the partition wall portion 74 suppressed the oil including the air bubbles caused by the agitation of the oil by the rotation of the output gear 183b from being sucked into the oil strainer 71.

(11) A bottom-side oil storage portion 91 is located between the first output unit 185 and the second output unit 186.

As a result, since the bottom-side oil storage portion 91 can be disposed using the dead space between the first output unit 185 and the second output unit 186, the transmission 10 can be easily made compact.

(12) The transmission 10 further includes a transmission shifter 17b that moves the engaging clutch 17a along the drive shaft 11 or the driven shaft 12, and
    operations of both the multiple disc clutch 13 and the transmission shifter 17b are hydraulically controlled.

(13) The oil stored in the oil storage portion 90 is also used for lubrication of one or more components selected from the group including the multiple disc clutch 13, the drive shaft 11, the driven shaft 12, the plurality of gear-position gear trains 30, and the engaging clutch 17a.

(14) The transmission 10 further includes a hydraulic control circuit 77 used for the hydraulic control, and
    the hydraulic control circuit 77 is provided on a partition wall 82 of the transmission case 80.

(15) The irregular ground travelling vehicle 1 further includes a differential device 19, and
    the differential device 19 is located in the transmission case 80.

As a result, the oil used for lubricating the differential device 19 and the oil used for hydraulic control for the transmission 10 can be shared.

(16) The irregular ground travelling vehicle 1 further includes a clutch chamber R1 that accommodates the multiple disc clutch 13,
    the transmission case 80 defines a transmission gear chamber R2 that accommodates the drive shaft 11, the driven shaft 12, the plurality of gear-position gear trains 30, and the plurality of engaging clutches 17a, and
    the oil storage portion 90 extends across a clutch chamber R1 and a transmission gear chamber R2.

As a result, the large oil storage portion 90 can be secured, and a part of the multiple disc clutch 13 can be easily cooled by the oil in the oil storage portion 90.

(17) The irregular ground travelling vehicle 1 further includes:
    a first output unit 185 that outputs a driving force 10 shifted by the transmission toward the rear wheels 2R which are the first drive wheels; and
    a second output unit 186 that outputs the driving force shifted by the transmission 10 toward the front wheels 2F which are the second drive wheels, and
    the deepest portion 90a of the oil storage portion 90 is located below the first output unit 185 and the second output unit 186.

(18) An irregular ground travelling vehicle 1 including a transmission 10, the transmission 10 including:
    a transmission case 80 in which a gear for shifting is accommodated and which has a bottom portion including a bottom-side oil storage portion 91 which is recessed downward from a remaining portion and in which oil is stored;
    a transmission 17b shifter for switching an engagement state of the gear for shifting;
    a hydraulic actuator 17c that generates a driving force for driving the transmission shifter 17b by pressure-fed oil; and
    an oil pump 75 that sucks the oil stored in the bottom-side oil storage portion 91 and pressure-feeds the oil to the hydraulic actuator 17c.

As a result, by sucking the oil stored in the bottom-side oil storage portion 91 recessed downward in the bottom portion of the transmission case 80, even if the oil liquid level swings due to the shake of the vehicle body, it is easy to pressure-feed the oil to the hydraulic actuator 17c while suppressing the mixture of air. As a result, the reliability of the operation of the hydraulic actuator 17c can be enhanced, and the engagement state of the gear for shifting can be switched to stably perform the shift.

(19) A transmission 10 includes:
    a drive shaft 11 to which power is input from a drive source 6;
    a multiple disc clutch 13 that connects/disconnects power transmission from the drive source 6 to the drive shaft 11;
    a driven shaft 12;
    a plurality of gear-position gear trains 30 provided between the drive shaft 11 and the driven shaft 12, each of the plurality of gear-position gear trains 30 being configured such that a gear that is relatively non-rotatable with respect to one of the drive shaft 11 and the driven shaft 12 and a gear that is relatively rotatable with respect to the other of the drive shaft 11 and the driven shaft 12 are meshed with each other;
    a plurality of engaging clutches 17a that enable power transmission of each of the plurality of gear-position gear trains 30;
    a transmission case 80 that defines a transmission gear chamber R2 that accommodates the drive shaft 11, the driven shaft 12, the plurality of gear-position gear trains 30, and the plurality of engaging clutches 17a;
    an oil storage portion 90 in which oil used for hydraulic control of the multiple disc clutch 13 and the engaging clutch 17a is stored at a bottom portion of the transmission case 80;
    an oil strainer 71 having a suction port 72e located in the oil storage portion 90; and
    a clutch chamber R1 that accommodates the multiple disc clutch 13,
    in which the multiple disc clutch 13 includes a clutch first portion 131f located in the oil storage portion 90, and
    in which the oil storage portion 90 extends across the clutch chamber R1 and the transmission gear chamber R2.

(20) The transmission case 80 includes a partition wall 82 that separates the clutch chamber R1 and the transmission gear chamber R2,
    the partition wall 82 is provided with a through hole 82a that allows the clutch chamber R1 and the transmission gear chamber R2 to communicate with each other,
    a lower end of the transmission gear chamber R2 is positioned below a lower end of the clutch chamber R1, and
    a deepest portion 90a of the oil storage portion 90 is formed in the transmission gear chamber R2.

As a result, it is easy to store the oil in the oil storage portion 90 on the transmission gear chamber R2 side.

Various modifications and changes can be made without departing from the scope of the present disclosure.

What is claimed is:
1. An irregular ground travelling vehicle comprising:
    a drive source; and
    a transmission,
    the transmission including:
    a drive shaft configured to have power input thereto from the drive source;
    a multiple disc clutch configured to connect or disconnect power transmission from the drive source to the drive shaft;
    a driven shaft;

a plurality of gear-position gear trains between the drive shaft and the driven shaft, each of the plurality of gear-position gear trains being configured such that a gear that is relatively non-rotatable with respect to one of the drive shaft and the driven shaft and a gear that is relatively rotatable with respect to the other of the drive shaft and the driven shaft are configured to be meshed with each other;

a plurality of engaging clutches configured to enable power transmission of each of the plurality of gear-position gear trains;

a transmission case that accommodates the drive shaft, the driven shaft, the plurality of gear-position gear trains, and the plurality of engaging clutches;

an oil storage portion configured to store oil for hydraulic control of the multiple disc clutch and the plurality of engaging clutches at a bottom portion of the transmission case, the oil storage portion having a deepest portion at a center of the oil storage portion in a vehicle left-right direction in a vehicle mounted state; and an oil strainer having a suction port in the oil storage portion, wherein:

the multiple disc clutch includes a clutch first portion in the oil storage portion;

the transmission is a dual clutch transmission including, as the multiple disc clutch, an upper clutch and a lower clutch below the upper clutch; and the lower clutch includes the clutch first portion.

2. The irregular ground travelling vehicle according to claim 1, wherein the deepest portion of the oil storage portion is below a lower end of the multiple disc clutch.

3. The irregular ground travelling vehicle according to claim 1, further comprising a first output unit configured to output a driving force shifted by the transmission toward a first drive wheel, wherein the deepest portion of the oil storage portion is below the first output unit.

4. The irregular ground travelling vehicle according to claim 1, wherein:

the drive shaft includes an upper drive shaft configured to have power transmitted thereto from the drive source via the upper clutch and a lower drive shaft configured to have power transmitted thereto from the drive source via the lower clutch; and one of the plurality of gear-position gear trains constituting a starting gear position includes a drive gear on the lower drive shaft.

5. The irregular ground travelling vehicle according to claim 1, wherein:

the multiple disc clutch includes a plurality of friction plates for connection or disconnection of power transmission from the drive source to the drive shaft; and the transmission is configured to manage an oil level in the oil storage portion, during operation, to be above lower ends of the plurality of friction plates.

6. The irregular ground travelling vehicle according to claim 1, further comprising:

a first output unit configured to output a driving force toward a first drive wheel; and a second output unit configured to output the driving force toward a second drive wheel, wherein an output gear configured to transmit the driving force transmitted to the first output unit to the second output unit is in the oil storage portion.

7. The irregular ground travelling vehicle according to claim 6, further comprising a partition wall portion between the suction port of the oil strainer and the second output unit in the oil storage portion.

8. The irregular ground travelling vehicle according to claim 6, wherein the oil storage portion is between the first output unit and the second output unit.

9. The irregular ground travelling vehicle according to claim 1, wherein:

the transmission further includes a transmission shifter configured to move the plurality of engaging clutches along the drive shaft or the driven shaft; and the transmission is configured to hydraulically control operations of both the multiple disc clutch and the transmission shifter.

10. The irregular ground travelling vehicle according to claim 1, wherein the transmission is configured to use the oil stored in the oil storage portion for lubrication of at least one of the multiple disc clutch, the drive shaft, the driven shaft, the plurality of gear-position gear trains, or the plurality of engaging clutches.

11. The irregular ground travelling vehicle according to claim 1, wherein:

the transmission further includes a hydraulic control circuit for hydraulic control; and the hydraulic control circuit is at the transmission case.

12. The irregular ground travelling vehicle according to claim 1, further comprising a differential device, wherein the differential device is in the transmission case.

13. The irregular ground travelling vehicle according to claim 1, further comprising a clutch chamber that accommodates the multiple disc clutch, wherein:

the transmission case defines a transmission gear chamber that accommodates the drive shaft, the driven shaft, the plurality of gear-position gear trains, and the plurality of engaging clutches; and the oil storage portion extends across the transmission gear chamber and the clutch chamber.

14. The irregular ground travelling vehicle according to claim 1, further comprising:

a first output unit configured to output a driving force shifted by the transmission toward a first drive wheel; and a second output unit configured to output the driving force shifted by the transmission toward a second drive wheel, and wherein the deepest portion of the oil storage portion is below the first output unit and the second output unit.

15. An irregular ground travelling vehicle comprising:

a drive source; and a transmission, the transmission including:

a drive shaft configured to have power input thereto from the drive source;

a multiple disc clutch configured to connect or disconnect power transmission from the drive source to the drive shaft;

a transmission case in which a gear for shifting is accommodated and which has a bottom portion including an oil storage portion which is recessed downward from a remaining portion and configured to store oil;

a transmission shifter for switching an engagement state of the gear for shifting;

a hydraulic actuator configured to generate a driving force for driving the transmission shifter by pressure-fed oil; and a pump configured to suck the oil stored in the oil storage portion and pressure-feed the oil to the hydraulic actuator, wherein:

the multiple disc clutch includes a clutch first portion in the oil storage portion;

the transmission is a dual clutch transmission including, as the multiple disc clutch, an upper clutch and a lower clutch below the upper clutch; and the lower clutch includes the clutch first portion.

16. A transmission comprising:

a drive shaft configured to have power input thereto from a drive source;

a multiple disc clutch configured to connect or disconnect power transmission from the drive source to the drive shaft;

a driven shaft;

a plurality of gear-position gear trains between the drive shaft and the driven shaft, each of the plurality of gear-position gear trains being configured such that a gear that is relatively non-rotatable with respect to one of the drive shaft and the driven shaft and a gear that is relatively rotatable with respect to the other of the drive shaft and the driven shaft are configured to be meshed with each other;

a plurality of engaging clutches configured to enable power transmission of each of the plurality of gear-position gear trains;

a transmission case that defines a transmission gear chamber that accommodates the drive shaft, the driven shaft, the plurality of gear-position gear trains, and the plurality of engaging clutches;

an oil storage portion configured to store oil for hydraulic control of the multiple disc clutch and the plurality of engaging clutches at a bottom portion of the transmission case;

an oil strainer having a suction port in the oil storage portion; and a clutch chamber that accommodates the multiple disc clutch, wherein:

the multiple disc clutch includes a clutch first portion in the oil storage portion;

the oil storage portion extends across the transmission gear chamber and the clutch chamber;

the multiple disc clutch includes a plurality of friction plates for connection or disconnection of power transmission from the drive source to the drive shaft; and the transmission is configured to manage an oil level in the oil storage portion, during operation, to be above lower ends of the plurality of friction plates.

17. The transmission according to claim 16, wherein:

the transmission case includes a partition wall that separates the transmission gear chamber and the clutch chamber;

the partition wall includes a through hole that allows the transmission gear chamber and the clutch chamber to communicate with each other;

a lower end of the transmission gear chamber is below a lower end of the clutch chamber; and a deepest portion of the oil storage portion is defined in the transmission gear chamber.

\* \* \* \* \*